US012812582B2

(12) United States Patent
Totadamane Ramappa et al.

(10) Patent No.: US 12,812,582 B2
(45) Date of Patent: Nov. 24, 2026

(54) SERVICE ACCESS RESTRICTION ENHANCEMENTS FOR 5G NEW RADIO (NR)

(71) Applicant: APPLE INC., Cupertino, CA (US)

(72) Inventors: Shashanka Totadamane Ramappa, Bengaluru (IN); Anikethan Ramakrishna Vijaya Kumar, Bengaluru (IN); Krisztian Kiss, Rancho Santa Fe, CA (US); Nirlesh Koshta, Bengaluru (IN); Nitin Kuppelur, Bengaluru (IN); Sridhar Prakasam, Fremont, CA (US); Vijay Venkataraman, San Jose, CA (US)

(73) Assignee: APPLE INC., Cupertino, CA (US)

( * ) Notice: Subject to any disclaimer, the term of this patent is extended or adjusted under 35 U.S.C. 154(b) by 641 days.

(21) Appl. No.: 18/251,165

(22) PCT Filed: Sep. 3, 2021

(86) PCT No.: PCT/US2021/071363
§ 371 (c)(1),
(2) Date: Apr. 28, 2023

(87) PCT Pub. No.: WO2022/099231
PCT Pub. Date: May 12, 2022

(65) Prior Publication Data

US 2024/0080790 A1 Mar. 7, 2024

(30) Foreign Application Priority Data

Nov. 6, 2020 (IN) ............................ 202041048522

(51) Int. Cl.
*H04W 48/04* (2009.01)
*H04W 60/04* (2009.01)
*H04W 84/04* (2009.01)

(52) U.S. Cl.
CPC .......... *H04W 60/04* (2013.01); *H04W 48/04* (2013.01); *H04W 84/042* (2013.01)

(58) Field of Classification Search
None
See application file for complete search history.

(56) References Cited

U.S. PATENT DOCUMENTS

2008/0304494 A1 12/2008 Yokoyama
2018/0234894 A1 8/2018 Jiang
2020/0213938 A1 7/2020 Kim et al.

FOREIGN PATENT DOCUMENTS

CN 1602110 A 3/2005
CN 106658758 A 5/2017
(Continued)

OTHER PUBLICATIONS

3GPP (ETSI TS 124 501 V16.5.1 (Aug. 2020)).*
(Continued)

*Primary Examiner* — Abdelillah Elmejjarmi
(74) *Attorney, Agent, or Firm* — Dorsey & Whitney LLP

(57) ABSTRACT

This disclosure describes example embodiments and techniques to resolve UE behavior for several SAR use cases. The substate selection for a UE which has a valid SAR list and is currently camped on a cell which is in the registered PLMN or a PLMN from the list of equivalent PLMNs and whose TAI is not in the list of "allowed tracking areas" or is camped on a cell whose TAI is in the list of "non-allowed tracking areas," has gaps in functionality and certain use cases. There are conflicting requirements as to what is the substate to be chosen by the UE. Additionally, there are certain behaviors missing for a UE in substate 5GMM-REGISTERED.NON-ALLOWED-SERVICE.

6 Claims, 8 Drawing Sheets

(56) References Cited

FOREIGN PATENT DOCUMENTS

| | | | |
|---|---|---|---|
| CN | 107211342 | A | 9/2017 |
| CN | 107635270 | A | 1/2018 |
| CN | 111436090 | A | 7/2020 |
| WO | 2020145273 | A1 | 7/2020 |
| WO | 2020171529 | A1 | 8/2020 |

OTHER PUBLICATIONS

Huawei, Hisilicon, Vivo , "UE behaviour in 5GMM substate", C1-173716, 3GPP TSG-CT WG1 Meeting #105, Krakow (Poland), Agenda Item 15.2.1.3, Aug. 21-25, 2017, 8 pages.
Nokia, Nokia Shanghai Bell , "Initiation of ESFB by a UE in the state 5GMM-Registered.Attempting-Registration-Update", C1-202380, 3GPP TSG-CT Meeting #123-e, Electronic Meeting, Change Request 24.501 CR 2140 Rev—Current version: 16.4.1, Apr. 16-24, 2020, 39 pages.
PCT/US2021/071363 , Invitation to Pay Additional Fees And, Where Applicable, Protest Fee, Dec. 21, 2021, 18 pages.
PCT/US2021/071363 , International Search Report and Written Opinion, Feb. 11, 2022, 23 pages.
OPPO, "Service area restriciton not applicable to SR for PC5 V2X", C1-204563, 3GPP TSG-CT WG1 Meeting #125-e, Electronic Meeting, Change Request 24.501 CR 2417 Current Version 16.5.1, Aug. 20-28, 2020, 34 pages.

* cited by examiner

SERVICE ACCESS RESTRICTION ENHANCEMENTS FOR 5G NEW RADIO (NR)

TECHNICAL FIELD

This application relates generally to wireless communication systems, including service access restriction functionality.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
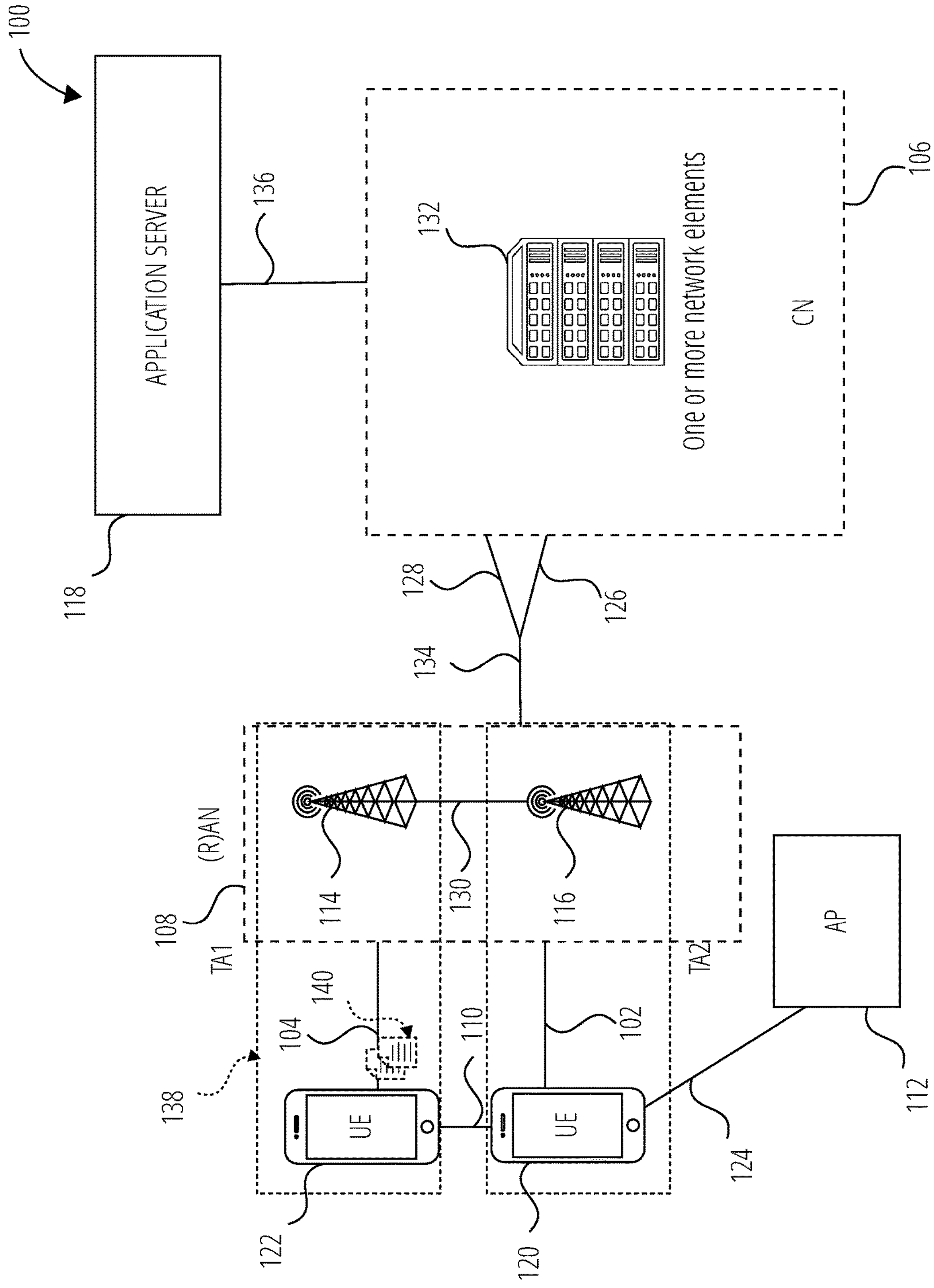
FIG. 1 is a block diagram of a system for wireless communications, in accordance with one embodiment.

FIG. 1 illustrates an example architecture of a system 100 of a network, in accordance with various embodiments. The following description is provided for an example system 100 that operates in conjunction with the LTE system standards and 5G system (5GS) or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 122 and/or the UE 120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108). In embodiments, the (R)AN 108 may be an NG RAN or a SG RAN, an E-UTRAN, or a legacy RAN, such as a UTRAN or GERAN. As used herein, the term "NG RAN" or the like may refer to a (R)AN 108 that operates in an NR or SG system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 122 and UE 120 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WLAN node," "WLAN," "WLAN Termination," "WT" or the like) via connection 124. The connection 124 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124. IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116); a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) or by a server pool in a similar manner as the CRAN/vBBUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an SGC via an NG interface (discussed infra). In V2X scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the UE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, eLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 122 and UE 120, RAN node 114 or RAN node 116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be nine microseconds (μs); however, the size of the CWS and an MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC), the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 122 from an SeNB for user data; information of PDCP PDUs that were not delivered to a UE 122; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a SG or NR system (e.g., when CN 106 is an SGC), the interface 130 may be an Xn interface. The Xn interface is defined between two or more RAN nodes (e.g., two or more gNBs and the like) that connect to SGC, between a RAN node 114 (e.g., a gNB) connecting to SGC and an eNB, and/or between two eNBs connecting to 5GC (e.g., CN 106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode (e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116; and control of user plane tunnels between old (source) serving RAN node 114 to new (target) serving RAN node 116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 108 is shown to be communicatively coupled to a core network-in this embodiment, CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UMTS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN node 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and Access and Mobility Management Functions (AMFs).

In embodiments, the CN 106 may be a SG CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMEs.

In connection with the 5GS mobility management (5GMM) protocol, as per Release 16 of 3GPP TS 24.501, section 5.3.5, a UE, such as UE 122, can be service restricted based on tracking areas 138 (TA) forming either an allowed area or a non-allowed area. An allowed or non-allowed area is established from a tracking area identity list 140 (TAI list, or simply TAI) a network sends to a UE in a restriction-accept or configuration-update command including the Service Area List information element (IE). A TAI list is the list of areas where a UE is considered to be registered (registration area). A service area restriction (SAR) list is the list of tracking areas in which each TA is either tagged as "allowed" or "non-allowed."

Based on the allowed or non-allowed area, the services available for the UE are determined. In an allowed area, the UE is in normal service such that it can leverage all the service of 5G. But when it is in a non-allowed area (i.e., when the specification has restriction on the services that can be used), available services and corresponding UE behavior are guided by a substate called 5GMM-REGISTERED-.NON-ALLOWED-SERVICE. Accordingly, previously under 3GPP TS 24.501, whenever a UE was camped on a cell which is in the registered PLMN or a PLMN from the list of equivalent PLMNs and whose TAI is not in the list of "allowed tracking areas" or is camped on a cell whose TAI is in the list of "non-allowed tracking areas," the UE has been specified to be in 5GMM-REGISTERED.NON-ALLOWED-SERVICE.

The substate selection for a UE which has a valid SAR list and is currently camped on a cell which is in the registered PLMN or a PLMN from the list of equivalent PLMNs and whose TAI is not in the list of "allowed tracking areas" or is camped on a cell whose TAI is in the list of "non-allowed tracking areas," has gaps in functionality and certain use cases. There are conflicting requirements as to what is the substate to be chosen by the UE. Additionally, there are certain behaviors missing for a UE in substate 5GMM-REGISTERED.NON-ALLOWED-SERVICE. This disclosure describes example embodiments and techniques to resolve UE behavior for such use cases.

In a first example scenario under the previous specifications, there is ambiguity in substate selection and related issues. In a restricted service area, a UE can do mobility registrations and period registrations, use emergency services, respond to paging, and can do high-priority data access. The UE can use these critical, mandatory, or high-priority services but it cannot use it for typical data service and the like. With mobility and periodic registration allowed, the UE may get stuck in other substates.

Specifically, the following two sections per Release 16 of 3GPP TS 24.501 imply that as long as the UE is registered in the PLMN and not necessarily successfully registered in the current registration area, then the UE can move to substate 5GMM-REGISTERED.NON-ALLOWED-SERVICE. The first section, "5.1.3.2.1.4.3 5GMM-REGISTERED.NON-ALLOWED-SERVICE" states that the substate 5GMM-REGISTERED.NON-ALLOWED-SERVICE is chosen in the UE if, for 3GPP access, the cell the UE selected is known to be in a non-allowed area. The second section, "5.3.5.2 3GPP access service area restrictions" states that if the UE is successfully registered to a PLMN and has a stored list of "allowed tracking areas," then while camped on a cell which is in the registered PLMN or a PLMN from the list of equivalent PLMNs and whose TAI is not in the list of "allowed tracking areas," the UE shall enter the state 5GMM-REGISTERED.NON-ALLOWED-SERVICE.

The specified behaviors set forth above may lead to mismatches on the expected UE behavior when a substate other than 5GMM-REGISTERED.NORMAL-SERVICE is involved. For example, consider the following sequence and resulting issues. First, a UE registers successfully on PLMN A and receives SAR list with TA1, TA2, TA3 as non-allowed area. But the current registration area has TA1 and TA2. This "registration area" is generally referred to as TAI list. Second, the UE moves to TA3 and attempts mobility registration. Due to the cell having mobile originated (MO)-signaling barred, the registration procedure is rejected by lower-layers. Third, now as per the above specifications, the UE chooses 5GMM-REGISTERED.NON-ALLOWED-SERVICE. This is so because the UE is registered in the PLMN and there is 5GMM context available with the UE as well as the network. But the registration in the current TA has not been successful. A UE not camped on a TA which is restricted as per SAR list would have chosen substate 5GMM-REGISTERED.UPDATE-NEEDED. And in this substate, upon alleviation of barring, the UE would have attempted mobility registration again, as per "5.2.3.2.7 UPDATE-NEEDED," under which the UE shall enter the appropriate new substate as soon as the lower layers indicate that the barring is alleviated for the access category with which the access attempt for the registration procedure for mobility and periodic registration update was associated. But a UE in substate 5GMM-REGISTERED.NON-ALLOWED-SERVICE, there is no such error handling because the UE is not expected to be in any substate other than 5GMM-REGISTERED.UPDATE-NEEDED when MO-signaling has failed due to barring and thereby cannot leverage alleviation of barring as a trigger for registration.

The specified behaviors described above may lead to the following situation as well. First, a UE registers successfully on PLMN A and receives SAR list with TA1, TA2, TA3 as non-allowed area. But the current registration area has TA1 and TA2. Second, the UE moves to TA3 and attempts mobility registration. The mobility registration fails due to lower layer failure. Third, now as per the existing clause for non-allowed-service substate, since the UE is registered in the PLMN it ends up choosing NON-ALLOWED-SERVICE as the substate and starts timer T3511. A UE not having a service area restriction would have moved to 5GMM-REGISTERED.ATTEMPTING-REGISTRATION-UPDATE. Fourth, after expiry of timer T3511, the UE reattempts mobility registration. But again, this fails due to lower layer failure. Fifth, now UE moves to TA2. At this point, the behavior with respect to resetting attempt counter/stopping T3502 (etc.) varies if the UE has chosen NON-ALLOWED-SERVICE as the substate. It becomes ambiguous as to what state the UE should end up in and whether the UE is supposed to take actions related to substate 5GMM-REGISTERED.ATTEMPTING-REGISTRATION-UPDATE for the TA change despite the substate being 5GMM-REGISTERED, NON-ALLOWED-SERVICE.

The aforementioned situation is based on one reference in "5.5.1 Registration procedure," "5.5.1.1 General" and two references in "5.5.1.3.2 Mobility and periodic registration update initiation." For all the three references, the UE ends up not taking actions due to being in NON-ALLOWED-SERVICE substate, whereas they should have actually been applicable. Specifically, "5.5.1 Registration procedure," "5.5.1.1 General" mentions that the registration attempt counter shall be reset when the UE is in substate 5GMM-DEREGISTERED.ATTEMPTING-REGISTRATION or 5GMM-REGISTERED.ATTEMPTING-REGISTRATION-UPDATE and a new tracking area is entered, timer T3502 expires, or timer T3346 is started. Also, "5.5.1.3.2 Mobility and periodic registration update initiation," describes additional UE actions when the UE in substate 5GMM-REGISTERED.ATTEMPTING-REGISTRATION-UPDATE decides to request new network slices after being rejected due to no allowed network slices requested; when the UE in state 5GMM-REGISTERED.ATTEMPTING-REGISTRATION-UPDATE receives a request from the upper layers to establish an emergency PDU session or perform emergency services fallback. But in a non-allowed area, the UE should initiate these aforementioned actions despite being in 5GMM-REGISTERED.NON-ALLOWED-SERVICE substate.

Additional such ambiguous cases are also addressed in this disclosure. In general, these cases arise in connection with the previous implementations under 3GPP TS 24.501 where a behavior is tied to a specific substate and ultimately ends up not being applicable for a UE in 5GMM-REGISTERED.NON-ALLOWED-SERVICE. This leads to issues in UE operation, as described above. Thus, always choosing 5GMM-REGISTERED.NON-ALLOWED-SERVICE as the substate ends up being misleading and can lead to errors in UE behavior. To address the ambiguity in substate selection and related issues in 5GMM protocol, a UE maintains a proper substate that more accurately reflects the proper set of pending actions for the UE, such as in accordance with the following two embodiments.

Figure 2:
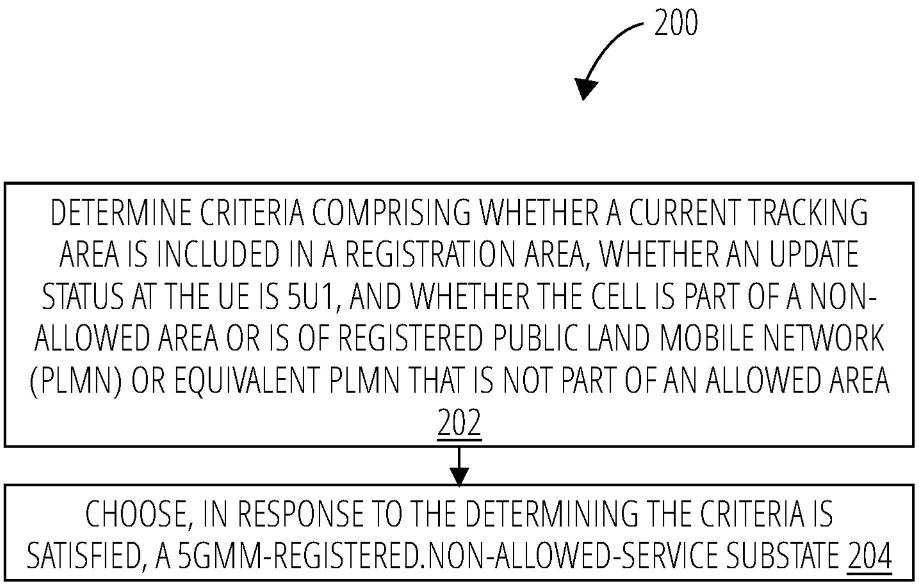
FIG. 2 illustrates a flow diagram in accordance with one embodiment.

A first embodiment entails service area restrictions tied to the tracking area of the cell the UE is camped on rather than the specific 5GMM substate. In other words, the intent is to avoid restrictions being imposed on state and instead facilitate imposing them based on checking whether a UE's current TAI is part of a non-allowed area or not part of the allowed area. FIG. 2 shows that in block 202, routine 200 determines criteria comprising whether a current tracking area is included in a registration area, whether an update status at the UE is 5GS update (5U) status 5U1 (i.e., UPDATED, the last registration attempt was successful), and whether the cell is part of a non-allowed area or is of registered public land mobile network (PLMN) or equivalent PLMN that is not part of an allowed area. In block 204, routine 200 chooses, in response to the determining the criteria is satisfied, a 5GMM-REGISTERED.NON-ALLOWED-SERVICE substate.

Accordingly, a more definite criteria of when to enter substate 5GMM-REGISTERED.NON-ALLOWED-SERVICE is provided since the previously available criteria the specification currently imposes is a very general criteria which also subsumes other substates and leads to problems. Anything apart from that criteria the UE will choose the corresponding existing substates and apply the restrictions there. A UE chooses 5GMM-REGISTERED.NON-ALLOWED-SERVICE in response to when a current TA is part of the registration area and the status at the UE is 5U1, and the UE is camped on a cell where SARs apply, e.g., (a) that is part of a non-allowed area or (b) of the registered PLMN or equivalent PLMN that is not part of the allowed area.

Additionally, in substates 5GMM-REGISTERED.UPDATE-NEEDED and 5GMM-REGISTERED.ATTEMPTING-REGISTRATION-UPDATE, if the UE is camped on a cell that is part of a non-allowed area or is camped on a cell of the registered PLMN or equivalent PLMN which is not part of the allowed area, then all restrictions that are applicable in substate 5GMM-REGISTERED.NON-ALLOWED-SERVICE are also applicable in the current substate.

For completeness, the first embodiment is now described by way of example changes to the TS 24.501 specification, "5.3.5.2 3GPP access service area restrictions," set forth as follows. If the UE is successfully registered to a PLMN, the 5GS update status is 5U1, the UE is camped on a cell whose TAI is part of the TAI list and if the UE has a stored list of "allowed tracking areas": (a) while camped on a cell whose TAI is in the list of "allowed tracking areas," the UE shall stay in, or enter, the state 5GMM-REGISTERED.NORMAL-SERVICE and is allowed to initiate any 5GMM and 5GSM procedures; and (b) while camped on a cell which is in the registered PLMN or a PLMN from the list of equivalent PLMNs and whose TAI is not in the list of "allowed tracking areas," the UE shall enter the state 5GMM-REGISTERED.NON-ALLOWED-SERVICE. If the UE is successfully registered to a PLMN, the 5GS update status is 5U1, the UE is camped on a cell whose TAI is part of the TAI list and the UE has a stored list of "non-allowed tracking areas": (a) while camped on a cell which is in the registered PLMN or a PLMN from the list of equivalent PLMNs and whose TAI is not in the list of "non-allowed tracking areas," the UE shall stay in, or enter, the state 5GMM-REGISTERED.NORMAL-SERVICE and is allowed to initiate any 5GMM and 5GSM procedures; and (b) while camped on a cell whose TAI is in the list of "non-allowed tracking areas," the UE shall enter the state 5GMM-REGISTERED.NON-ALLOWED-SERVICE. If a UE is in substate 5GMM-REGISTERED.ATTEMPTING-REGISTRATION-UPDATE or substate 5GMM-REGISTERED.UPDATE-NEEDED and is camped on a cell which is in the registered PLMN or a PLMN from the list of equivalent PLMNs and whose TAI is not in the list of "allowed tracking areas" or is camped on a cell whose TAI is in the list of "non-allowed tracking areas," then all restrictions applicable when in substate 5GMM-REGISTERED.NON-ALLOWED-SERVICE shall apply to the current substate.

Figure 3:
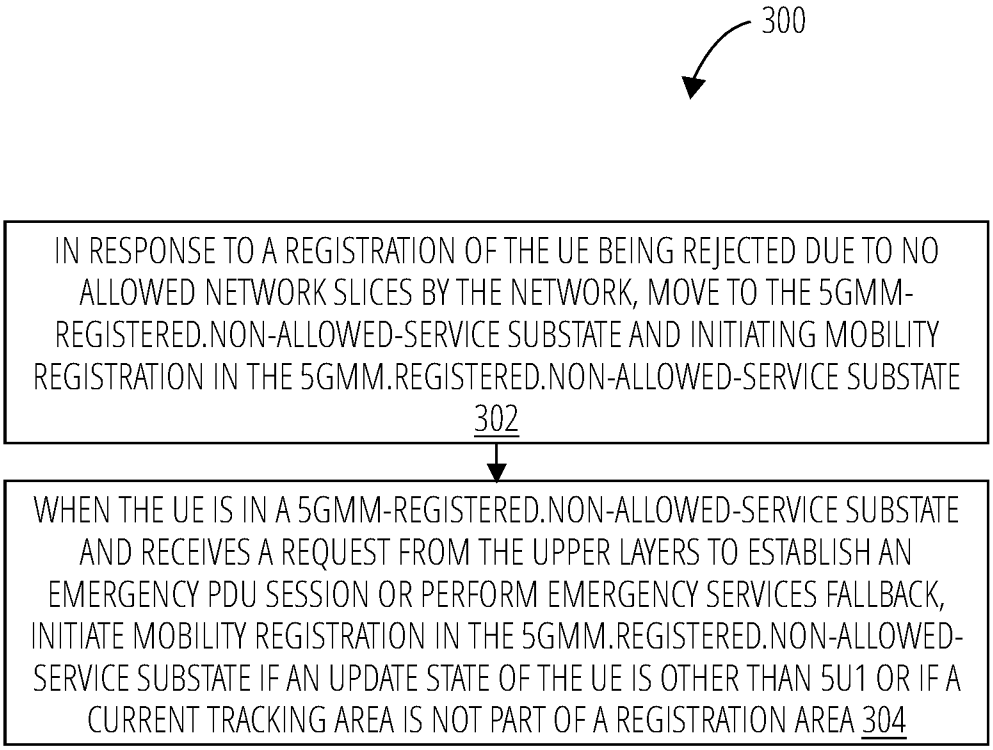
FIG. 3 illustrates a flow diagram in accordance with one embodiment.

A second embodiment entails enforcing additional actions for a UE in 5GMM-REGISTERED.NON-ALLOWED-SERVICE, i.e., essentially logical "ORing" additional behaviors with existing substate procedures. FIG. 3 shows that in block 302, routine 300 in response to a registration of the UE being rejected due to no allowed network slices by the network, moves to the 5GMM-REGISTERED.NON-ALLOWED-SERVICE substate and initiating mobility registration in the 5GMM.REGISTERED.NON-ALLOWED-SERVICE substate. In block 304, routine 300 when the UE is in a 5GMM-REGISTERED.NON-ALLOWED-SERVICE substate and receives a request from the upper layers to establish an emergency PDU session or perform emergency services fallback, initiates mobility registration in the 5GMM.REGISTERED.NON-ALLOWED-SERVICE substate if an update state of the UE is other than 5U1 or if a current tracking area is not part of a registration area.

If the intent is that the UE enters 5GMM-REGISTERED-.NON-ALLOWED-SERVICE as long as it is registered in the PLMN and if the UE is camped on a cell that is part of non-allowed-area or is camped on a cell in the current PLMN or equivalent PLMN which is not part of the allowed-area, then the UE could implement the following enhancements set forth below by way of an example update to TS 24.501. Two example embodiments are as follows, which are then followed by the second embodiment described, for completeness, by way of example changes to the TS 24.501 specification.

First, "5.5.1.3.2 Mobility and periodic registration update initiation" describes when the UE in substate 5GMM-REGISTERED.ATTEMPTING-REGISTRATION-UPDATE decides to request new network slices after being rejected due to no allowed network slices requested. In this case, the UE may initiate mobility registration in the above case in the substate 5GMM-REGISTERED.NON-ALLOWED-SERVICE. Alternatively, it is possible that a UE is not allowed to request access to new slices, other than those associated with high-priority or emergency services, when in substate 5GMM-REGISTERED.NON-ALLOWED-SERVICE and if the UE has at least one single network slice selection assistance information (S-NSSAI) in the allowed network slice selection assistance information (NSSAI).

Second, "5.5.1.3.2 Mobility and periodic registration update initiation" describes when the UE in state 5GMM-REGISTERED.ATTEMPTING-REGISTRATION-UPDATE receives a request from the upper layers to establish an emergency PDU session or perform emergency services fallback. In this case, the UE may initiate mobility registration when in substate 5GMM-REGISTERED.NON-ALLOWED-SERVICE, if update state is other than 5U1 or if current TA is not part of the registration area.

Under "5.6.2.2 Paging for 5GS services," upon reception of a paging indication, the UE shall stop the timer T3346, if running, and: (A) If control plane CIoT 5GS optimization is not used by the UE, the UE shall initiate a service request procedure over 3GPP access to respond to the paging as specified in subclauses 5.6.1.2.1 if the UE is in 5GMM-REGISTERED.NORMAL-SERVICE substate and the UE is in the 5GMM-IDLE mode without suspend indication; (B) If control plane CIoT 5GS optimization is used by the UE, the UE shall initiate a service request procedure over 3GPP access as specified in subclause 5.6.1.2.2, if the UE is in 5GMM-REGISTERED.NORMAL-SERVICE state and the UE is in the 5GMM-IDLE mode without suspend indication. The above scenarios may be applicable to 5GMM-REGISTERED.NON-ALLOWED-SERVICE as well.

The second embodiment will now be described by way of example changes to the TS 24.501 specification, "5.5.1 Registration procedure," "5.5.1.1 General." The registration attempt counter shall be reset when the UE is in substate 5GMM-DEREGISTERED. ATTEMPTING-REGISTRATION or 5GMM-REGISTERED.ATTEMPTING-REGISTRATION-UPDATE or 5GMM-REGISTERED.NON-ALLOWED-SERVICE, and a new tracking area is entered; timer T3502 expires; or timer T3346 is started.

The second embodiment will now be described by way of example changes to the TS 24.501 specification, "5.5.1.3.2 Mobility and periodic registration update initiation." It describes when the UE in state 5GMM-REGISTERED.ATTEMPTING-REGISTRATION-UPDATE or 5GMM-REGISTERED.NON-ALLOWED-SERVICE decides to request new network slices after being rejected due to no allowed network slices requested; and when the UE in state 5GMM-REGISTERED.ATTEMPTING-REGISTRATION-UPDATE or 5GMM-REGISTERED.NON-ALLOWED-SERVICE receives a request from the upper layers to establish an emergency PDU session or perform emergency services fallback.

The second embodiment will now be described by way of example changes to the TS 24.501 specification, "5.3.7 Handling of the periodic registration update timer and mobile reachable timer." If the UE is not registered for emergency services, and is in a state other than 5GMM-REGISTERED.NORMAL-SERVICE or 5GMM-REGISTERED.NON-ALLOWED-SERVICE over 3GPP access when timer T3512 expires, the periodic registration update procedure is delayed until the UE returns to 5GMM-REGISTERED.NORMAL-SERVICE or 5GMM-REGISTERED.NON-ALLOWED-SERVICE over 3GPP access.

The second embodiment will now be described by way of example changes to the TS 24.501 specification, "5.6.2.2 Paging for 5GS services." Upon reception of a paging indication, the UE shall stop the timer T3346, if running, and (a) if control plane CIoT 5GS optimization is not used by the UE, the UE shall: (1) initiate a service request procedure over 3GPP access to respond to the paging as specified in subclauses 5.6.1.2.1 if the UE is in 5GMM-REGISTERED-.NORMAL-SERVICE state or 5GMM-REGISTERED-.NON-ALLOWED-SERVICE state and the UE is in the 5GMM-IDLE mode without suspend indication; (b) if control plane CIoT 5GS optimization is used by the UE, the UE shall: (1) initiate a service request procedure over 3GPP access as specified in subclause 5.6.1.2.2, if the UE is in 5GMM-REGISTERED.NORMAL-SERVICE state or 5GMM-REGISTERED.NON-ALLOWED-SERVICE state and the UE is in the 5GMM-IDLE mode without suspend indication.

A variant of the first embodiment is to completely eliminate this 5GMM-REGISTERED.NON-ALLOWED-SERVICE substate being the criteria for imposing service area restrictions. This entails enforcing restriction solely based on UE being camped on a cell which is part of restricted area.

Figure 4:
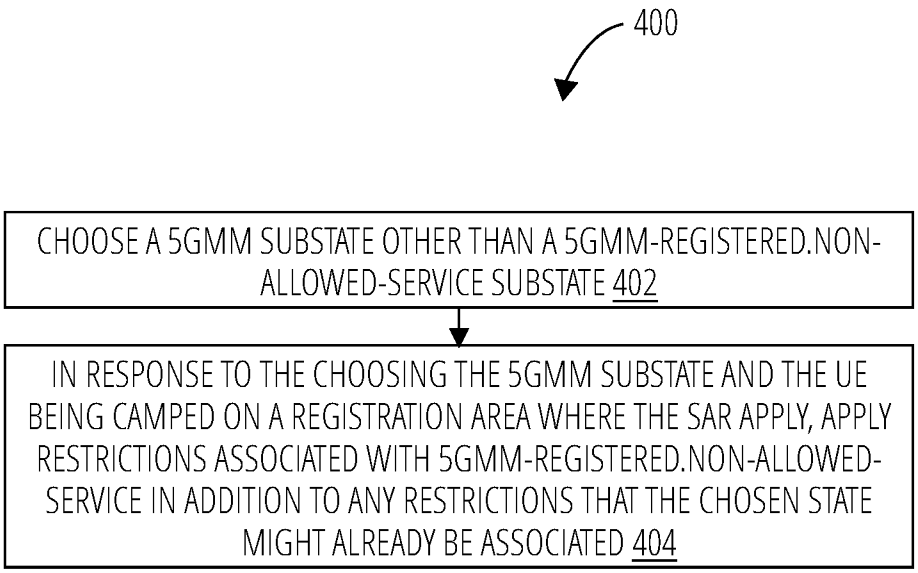
FIG. 4 illustrates a flow diagram in accordance with one embodiment.

FIG. 4 shows in block 402, routine 400 chooses a 5GMM substate other than a 5GMM-REGISTERED.NON-ALLOWED-SERVICE substate. In block 404, routine 400 in response to the choosing the 5GMM substate and the UE being camped on a registration area where the SAR apply, applies restrictions associated with 5GMM-REGISTERED-.NON-ALLOWED-SERVICE in addition to any restrictions that the chosen state might already be associated.

The UE need not use this additional 5GMM-REGISTERED.NON-ALLOWED-SERVICE substate. Restriction related to SAR is then imposed solely based on the UE currently camped on a cell which is part of non-allowed area or is camped on a cell in the current PLMN or equivalent PLMN which is not part of the allowed area. The UE will instead choose the existing 5GMM substates which are defined in TS 24.501. And whenever in these substates, as defined for 5GMM protocol in TS 24.501, the UE is also camped on a registration area where the SARs apply, all those restriction will additionally (i.e., in addition to any restriction that the UE substate might be subject to as per TS 24.501) be applicable to the UE at that point in time.

Another issue with 5GMM-REGISTERED.NON-ALLOWED-SERVICE is that there have been no techniques for handling a PDU release procedures in this substate. For example, as per the existing 5GMM protocol, 5GSM procedures are not allowed when a UE is in 5GMM-REGISTERED.NON-ALLOWED-SERVICE. Hence the UE behavior for release of PDU session in this substate is not optimal. According to the existing flow: (1) 5GSM will attempt PDU session release and will start T3582. (2) The connection establishment will be rejected due to service area restriction. (3) 5GSM will wait for expiry of the guard timer and will retry the procedure five times in total. Upon reaching maximum attempts the session is released locally. This is inefficient since the PDU session release takes 40 seconds in spite of it being already known that the PDU session signaling cannot be initiated in a non-allowed area.

Figure 5:
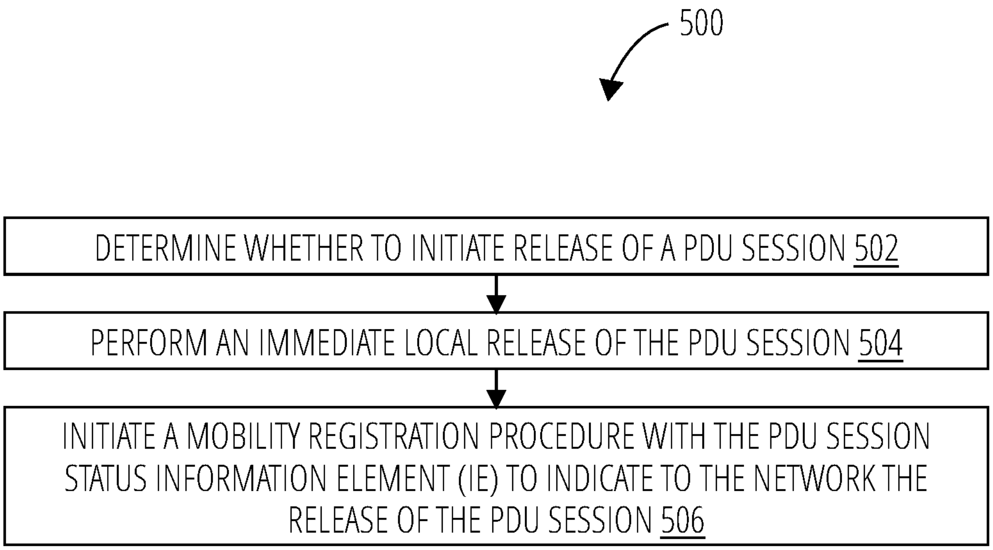
FIG. 5 illustrates a flow diagram in accordance with one embodiment.

Accordingly, an embodiment is described for a PDU session release in 5GMM-REGISTERED.NON-ALLOWED-SERVICE. If a UE in 5GMM-REGISTERED-.NON-ALLOWED-SERVICE substate and seeks to initiate release of a PDU session, it shall do an immediate local release of the PDU session and shall initiate a mobility registration procedure with the PDU session status IE to indicate to the network the release of the PDU session. In other words, it is preferable to not attempt a PDU session release signaling at all when it is already known that 5GSM procedures are disallowed. FIG. 5 shows in block 502, routine 500 determines whether to initiate release of a PDU session. In block 504, routine 500 performs an immediate local release of the PDU session. In block 506, routine 500 initiates a mobility registration procedure with the PDU session status information element (IE) to indicate to the network the release of the PDU session.

Alternatively, it is also possible when a UE is in 5GMM-REGISTERED.NON-ALLOWED-SERVICE or camped on a tracking area where service restrictions are applicable, the UE is allowed to initiate a PDU session release signaling procedure, i.e., sending over the air messages for PDU session release. Restriction for other 5GSM procedures are still applicable.

The embodiment will now be described by way of example changes to the TS 24.501 specification, "6.4.3.5 Abnormal cases in the UE." The following abnormal cases can be identified: (D) PDU session release signaling restricted due to Service Area restriction. The UE shall release the allocated PTI, perform a local release of the PDU session, and perform the registration procedure for mobility and periodic registration update with a REGISTRATION REQUEST message including the PDU session status IE over each access that user plane resources have been established if the PDU session is an MA PDU session, or over the access the PDU session is associated with if the PDU session is a single access PDU.

Another issue with SARs is that it is possible that a UE has set the follow-on-request bit but upon receiving registration accept, realizes that the pending service cannot be initiated due to SARs. Handling for this use case is currently missing in the specification. This typical situation is as follows (1) UE has pending 5GSM signaling and registration. (2) UE initiates registration with Follow-on-request flag set to TRUE. (3) Network accepts registration and also indicates follow-on-proceed. (4) Also, the current registration area is provided as part of non-allowed area in the registration accept. (5) The network prolongs the connection due to having accepted FOR. (6) But the UE is unable to initiate 5GSM signaling since 5GSM signaling (which is not due to emergency/high-priority) is not allowed when SAR restrictions apply. Two embodiments address this issue.

Figure 6:
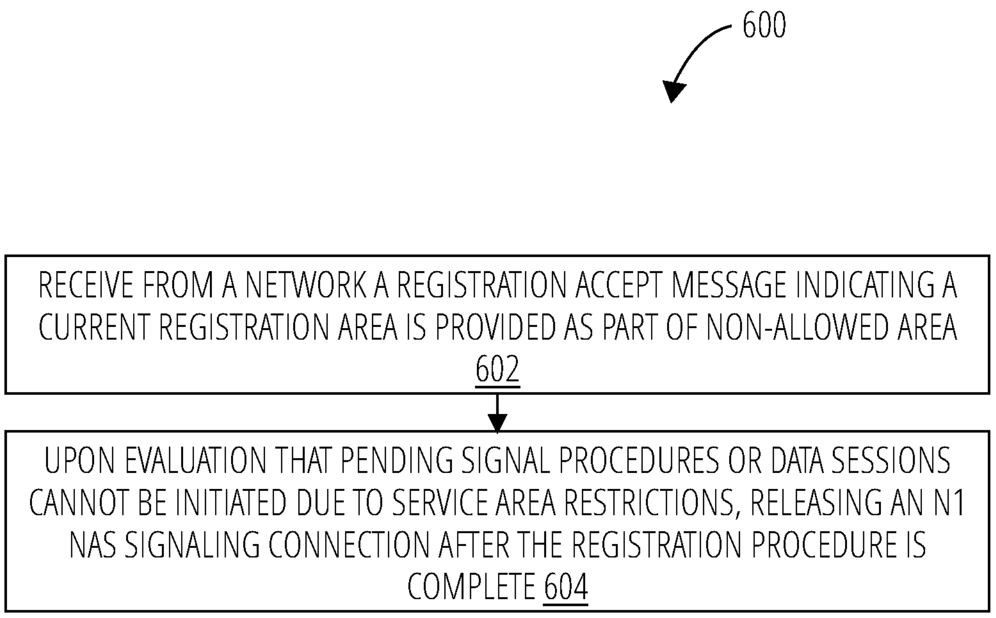
FIG. 6 illustrates a flow diagram in accordance with one embodiment.

In a first embodiment, in such a use case the UE needs to immediately release the signaling connection after the registration procedure is complete. Alternately it is possible that the UE start T3540 to guard connection release. FIG. 6 shows in block 602, routine 600 receives from a network a registration accept message indicating a current registration area is provided as part of non-allowed area. In block 604, routine 600 upon evaluation that pending signals procedures or data sessions cannot be initiated due to service area restrictions, releasing an N1 NAS signaling connection after the registration procedure is complete.

The first embodiment will now be described by way of example changes to the TS 24.501 specification, "5.3.1.3 Release of the N1 NAS signaling connection." If the UE had set the Follow-on request indicator to "Follow-on request pending" in the REGISTRATION REQUEST message due to pending uplink signaling but cannot send the pending signaling due to service area restriction or due to network not supporting the feature as indicated in the REGISTRATION ACCEPT message (for example UE set the "Follow-on request pending" to send SMS over NAS but AMF notified "SMS over NAS not allowed") and if there is no further pending data or signaling and user plane resources have not been set up, the UE may locally release the established N1 NAS signaling connection upon completion of the registration procedure.

In a second embodiment, it is possible that if a UE indicates Follow-On-Request in the registration request and based on the establishment cause or any other mechanism the AMF is able to derive that the pending request is neither for emergency nor for high-priority and if the current registration area of the UE is part of the Service Area restriction, then the network shall not indicate Follow-On-Proceed and shall release the N1 signaling connection after the completion of the procedure.

Yet another issue with SARs is in avoiding redundant mobility registration update procedure in non-allowed area. A UE is allowed to trigger mobility registration to request for access to new slices. But a UE in a restricted service area will not be allowed to access any of the services that the slice offers due to 5GSM signaling being restricted (i.e., UE is unable to establish a PDU session for the requested slice). Hence this new slice triggered Mobility Registration can be avoided until UE comes out of Restricted Area. This creates unnecessary signaling when UE repeatedly connects and disconnects from new slices. The current proposal looks to avoid the same.

Figure 7:
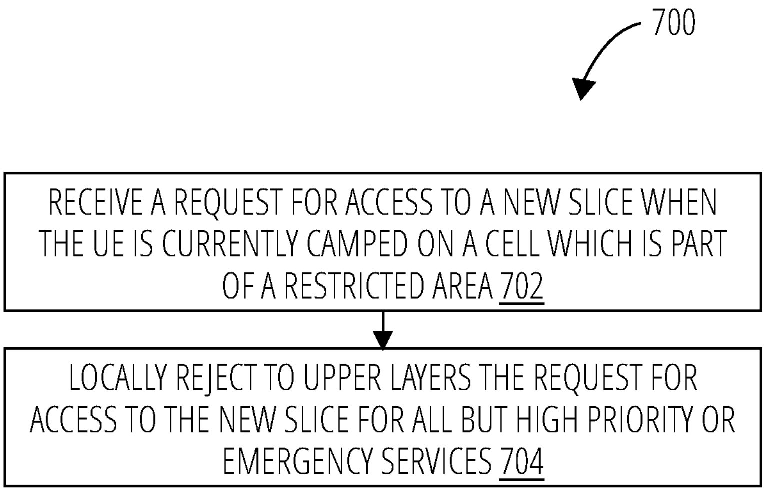
FIG. 7 illustrates a flow diagram in accordance with one embodiment.

To address this issue, when a request for access to new slice is received and UE is currently camped on a cell whose tracking area is part of restricted area, UE shall not honor the request for access to new slice but shall locally reject to upper layers. This means that no activity is initiated towards the network. The modem itself rejects the request based on evaluating the criteria for service area restrictions. Requests associated with high priority or emergency service, however, shall be honored. A UE in 5GMM-REGISTERED.NON-ALLOWED-SERVICE or UE camped on a tracking area where service restrictions are applicable and with at least one S-NSSAI in allowed NSSAI shall not attempt to request for access to new slices other than those associated with high priority access or emergency. FIG. 7 shows in block 702, routine 700 receives a request for access to a new slice when the UE is currently camped on a cell which is part of a restricted area. In block 704, routine 700 locally reject to upper layers the request for access to the new slice for all but high priority or emergency services.

Not attempting to request for access to new slices other than those associated with high priority access or emergency, as noted above, may also be considered as an independent enhancement. For example, whenever someone taps an app, and that tapping results in a mobility registration request for a slice, the user cannot get that normal service for the app (unless it is a high priority service). Requesting access to a new slice where the user anyway is not going to be able to establish any PDU sessions, it is desired to restrict unnecessary signaling towards the network.

Figure 8:
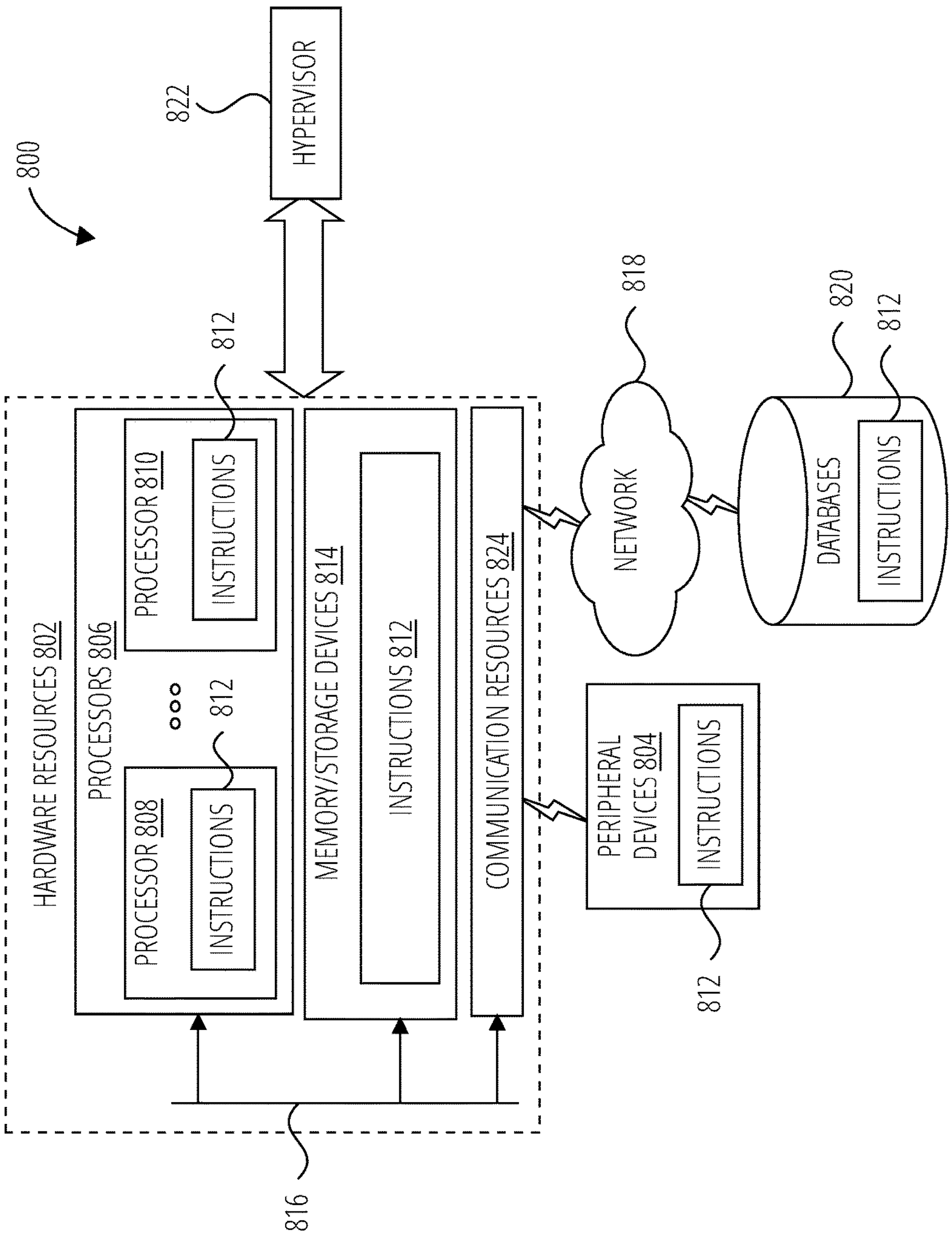
FIG. 8 is a block diagram, according to one embodiment.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 806 (or processor cores), one or more memory/storage devices 814, and one or more communication resources 824, each of which may be communicatively coupled via a bus 816. For embodiments where node virtualization (e.g., NFV) is utilized, a hypervisor 822 may be executed to provide an execution environment for one or more network slices/sub-slices to utilize the hardware resources 802.

The processors 806 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 808 and a processor 810.

The memory/storage devices 814 may include main memory, disk storage, or any suitable combination thereof. The memory/storage devices 814 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 824 may include interconnection or network interface components or other suitable devices to communicate with one or more peripheral devices 804 or one or more databases 820 via a network 818. For example, the communication resources 824 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 812 may comprise software, a program, an application, an applet, an app, or other executable code for causing at least any of the processors 806 to perform any one or more of the methodologies discussed herein. The instructions 812 may reside, completely or partially, within at least one of the processors 806 (e.g., within the processor's cache memory), the memory/storage devices 814, or any suitable combination thereof. Furthermore, any portion of the instructions 812 may be transferred to the hardware resources 802 from any combination of the peripheral devices 804 or the databases 820. Accordingly, the memory of the processors 806, the memory/storage devices 814, the peripheral devices 804, and the databases 820 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1. A method, performed by a user equipment (UE) for a 5G system (5GS) mobility management (5GMM) of associating service area restrictions (SAR) to a cell that the UE is camped on, the method comprising: determining criteria comprising whether a current tracking area is included in a registration area, whether an update status at the UE is 5U1, and whether the cell is part of a non-allowed area or is of registered public land mobile network (PLMN) or equivalent PLMN that is not part of an allowed area; and choosing, in response to the determining the criteria is satisfied, a 5GMM-REGISTERED.NON-ALLOWED-SERVICE substate.

Example 2. The method of Example 1, in which restrictions applicable to the UE in the 5GMM-REGISTERED.NON-ALLOWED-SERVICE substate are also applicable in a selected substate comprising at least one of 5GMM.REGISTERED.UPDATE-NEEDED and 5GMM-REGISTERED. ATTEMPTING-REGISTRATION-UPDATE substates provided the UE is camped on a cell that is part of a non-allowed area or is camped on a cell of the registered PLMN or equivalent PLMN which is not part of the allowed area, such that all restrictions that are applicable in the 5GMM-REGISTERED.NON-ALLOWED-SERVICE substate are also applicable in the selected substate in addition to any restrictions already be associated with the selected substate.

Example 3. A method, performed by a user equipment (UE) for a 5G system (5GS) mobility management (5GMM) in a network, of enforcing additional actions for the UE in a 5GMM-REGISTERED.NON-ALLOWED-SERVICE substate, the method comprising: in response to a registration of the UE being rejected due to no allowed network slices by the network, moving to the 5GMM-REGISTERED.NON-ALLOWED-SERVICE substate and initiating mobility registration in the 5GMM.REGISTERED.NON-ALLOWED-SERVICE substate; and when the UE is in a 5GMM-REGISTERED.NON-ALLOWED-SERVICE substate and receives a request from the upper layers to establish an emergency PDU session or perform emergency services fallback, initiating mobility registration in the 5GMM.REGISTERED.NON-ALLOWED-SERVICE substate if an update state of the UE is other than 5U1 or if a current tracking area is not part of a registration area.

Example 4. The method of Example 3, further comprising resetting a registration attempt counter when the UE is in the 5GMM-REGISTERED.NON-ALLOWED-SERVICE and a new tracking area is entered.

Example 5. The method of Example 3, further comprising resetting a registration attempt counter when the UE is in the 5GMM-REGISTERED.NON-ALLOWED-SERVICE and a timer T3502 expires.

Example 6. The method of Example 3, further comprising resetting a registration attempt counter when the UE is in the 5GMM-REGISTERED.NON-ALLOWED-SERVICE and a timer T3346 is started.

Example 7. A method, performed by a user equipment (UE) for a 5G system (5GS) mobility management (5GMM) of associating service area restrictions (SAR) to a cell that the UE is camped on, the method comprising: choosing a 5GMM substate other than a 5GMM-REGISTERED.NON-ALLOWED-SERVICE substate; and in response to the choosing the 5GMM substate and the UE being camped on a registration area where the SAR apply, applying restrictions associated with 5GMM-REGISTERED.NON-ALLOWED-SERVICE in addition to any restrictions that the chosen state might already be associated.

Example 8. A method, performed by a user equipment (UE) in a network for a 5G system (5GS) mobility management (5GMM) of PDU session release in a 5GMM-REGISTERED.NON-ALLOWED-SERVICE substate, the method comprising: determining whether to initiate release of a PDU session; performing an immediate local release of the PDU session; and initiating a mobility registration procedure with the PDU session status information element (IE) to indicate to the network the release of the PDU session.

Example 9. The method of Example 8, further comprising: determining whether it is also possible that the UE initiate PDU session release; and signaling towards the network when service area restrictions are applicable.

Example 10. A method, performed by a user equipment (UE) for a 5G system (5GS) mobility management (5GMM) of handling pending 5GSM signaling and registration with follow-on-request flag set to true in a registration procedure, the method comprising: receiving from a network a registration accept message indicating a current registration area is provided as part of non-allowed area; and upon evaluation that pending signaling procedures or data sessions cannot be initiated due to service area restrictions, releasing an N1 NAS signaling connection after the registration procedure is complete.

Example 11. The method of Example 10, further comprising starting a T3540 timer to guard connection release.

Example 12. The method of Example 10, further comprising causing the network to release N1 signaling connection after the registration procedure is complete.

Example 13. A method, performed by a user equipment (UE) for a 5G system (5GS) mobility management (5GMM) of avoiding redundant mobility registration update procedure in a non-allowed area, the method comprising: receiving a request for access to a new slice when the UE is currently camped on a cell which is part of a restricted area; and locally reject to upper layers the request for access to the new slice for all but high priority or emergency services.

Example 14. A non-transitory computer-readable storage medium, the computer-readable storage medium including instructions that when executed by a UE, cause the UE to: determine criteria comprising whether a current tracking area is included in a registration area, whether an update status at the UE is 5U1, and whether the cell is part of a non-allowed area or is of registered public land mobile network (PLMN) or equivalent PLMN that is not part of an allowed area; and choose, in response to the determining the criteria is satisfied, a 5GMM-REGISTERED.NON-ALLOWED-SERVICE substate.

Example 15. The computer-readable storage medium of Example 14, in which restrictions applicable to the UE in the 5GMM-REGISTERED.NON-ALLOWED-SERVICE substate are also applicable in a selected substate comprising at least one of 5GMM.REGISTERED.UPDATE-NEEDED and 5GMM-REGISTERED.ATTEMPTING-REGISTRATION-UPDATE substates provided the UE is camped on a cell that is part of a non-allowed area or is camped on a cell of the registered PLMN or equivalent PLMN which is not part of the allowed area, such that all restrictions that are applicable in the 5GMM-REGISTERED.NON-ALLOWED-SERVICE substate are also applicable in the selected substate in addition to any restrictions already be associated with the selected substate.

Example 16. A non-transitory computer-readable storage medium, the computer-readable storage medium including instructions that when executed by a UE, cause the UE to: in response to a registration of the UE being rejected due to no allowed network slices by the network, move to the 5GMM-REGISTERED.NON-ALLOWED-SERVICE substate and initiating mobility registration in the 5GMM.REGISTERED.NON-ALLOWED-SERVICE substate; and when the UE is in a 5GMM-REGISTERED.NON-ALLOWED-SERVICE substate and receives a request from the upper layers to establish an emergency PDU session or perform emergency services fallback, initiate mobility registration in the 5GMM.REGISTERED.NON-ALLOWED-SERVICE substate if an update state of the UE is other than 5U1 or if a current tracking area is not part of a registration area.

Example 17. The computer-readable storage medium of Example 16, wherein the instructions further configure the UE to reset a registration attempt counter when the UE is in the 5GMM-REGISTERED.NON-ALLOWED-SERVICE and a new tracking area is entered.

Example 18. The computer-readable storage medium of Example 16, wherein the instructions further configure the UE to reset a registration attempt counter when the UE is in the 5GMM-REGISTERED.NON-ALLOWED-SERVICE and a timer T3502 expires.

Example 19. The computer-readable storage medium of Example 16, wherein the instructions further configure the UE to reset a registration attempt counter when the UE is in the 5GMM-REGISTERED.NON-ALLOWED-SERVICE and a timer T3346 is started.

Example 20. A non-transitory computer-readable storage medium, the computer-readable storage medium including instructions that when executed by a UE, cause the UE to: choose a 5GMM substate other than a 5GMM-REGISTERED.NON-ALLOWED-SERVICE substate; and in response to the choosing the 5GMM substate and the UE being camped on a registration area where the SAR apply, apply restrictions associated with 5GMM-REGISTERED.NON-ALLOWED-SERVICE in addition to any restrictions that the chosen state might already be associated.

Example 21. A non-transitory computer-readable storage medium, the computer-readable storage medium including instructions that when executed by a UE, cause the UE to: determine whether to initiate release of a PDU session; perform an immediate local release of the PDU session; and initiate a mobility registration procedure with the PDU session status information element (IE) to indicate to the network the release of the PDU session.

Example 22. The computer-readable storage medium of Example 21, wherein the instructions further configure the UE to: determine whether it is also possible that the UE initiate PDU session release; and signal towards the network when service area restrictions are applicable.

Example 23. A non-transitory computer-readable storage medium, the computer-readable storage medium including instructions that when executed by a UE, cause the UE to: receive from a network a registration accept message indicating a current registration area is provided as part of non-allowed area; and upon evaluation that pending signal procedures or data sessions cannot be initiated due to service area restrictions, releasing an N1 NAS signaling connection after the registration procedure is complete.

Example 24. The computer-readable storage medium of Example 23, wherein the instructions further configure the UE to start a T3540 timer to guard connection release.

Example 25. The computer-readable storage medium of Example 23, wherein the instructions further configure the UE to cause the network to release N1 signaling connection after the registration procedure is complete.

Example 26. A non-transitory computer-readable storage medium, the computer-readable storage medium including instructions that when executed by a UE, cause the UE to: receive a request for access to a new slice when the UE is currently camped on a cell which is part of a restricted area; and locally reject to upper layers the request for access to the new slice for all but high priority or emergency services.

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a user equipment (UE) for a 5G system (5GS) mobility management (5GMM) of associating service area restrictions (SAR) to a cell that the UE is camped on, the method comprising:

determining criteria comprising (i) whether a current tracking area is included in a registration area, (ii) whether an update status at the UE is 5U1, and (iii) whether the cell is part of a non-allowed area or is of a registered public land mobile network (PLMN) or an equivalent PLMN that is not part of an allowed area; and in response to determining that (i) the current tracking area is in the registration area, (ii) the update status at the UE is 5U1, and (iii) the cell is part of the non-allowed area or is of a registered PLMN or an equivalent PLMN that is not part of an allowed area, choosing a 5GMM-REGISTERED.NON-ALLOWED-SERVICE substate.

2. The method of claim 1, in which restrictions applicable to the UE in the 5GMM-REGISTERED.NON-ALLOWED-SERVICE substate are also applicable in a selected substate comprising at least one of 5GMM.REGISTERED.UPDATE-NEEDED and 5GMM-REGISTERED.ATTEMPTING-REGISTRATION-UPDATE substates provided the cell the UE is camped on is part of the non-allowed area or is of the registered PLMN or the equivalent PLMN which is not part of the allowed area, such that all restrictions that are applicable in the 5GMM-REGISTERED.NON-ALLOWED-SERVICE substate are also applicable in the selected substate in addition to any restrictions already be associated with the selected substate.

3. A non-transitory computer-readable storage medium, the computer-readable storage medium including instructions that when executed by a user equipment (UE), cause the user equipment (UE) to:

determine criteria comprising (i) whether a current tracking area is included in a registration area, (ii) whether an update status at the UE is 5U1, and (iii) whether the cell is part of a non-allowed area or is of a registered public land mobile network (PLMN) or an equivalent PLMN that is not part of an allowed area; and in response to determining that (i) the current tracking area is in the registration area, (ii) the update status at the UE is 5U1, and (iii) the cell is part of the non-allowed area or is of a registered PLMN or an equivalent PLMN that is not part of an allowed area, choose a 5GMM-REGISTERED.NON-ALLOWED-SERVICE substate.

4. The non-transitory computer-readable storage medium of claim 3, in which restrictions applicable to the UE in the 5GMM-REGISTERED.NON-ALLOWED-SERVICE substate are also applicable in a selected substate comprising at least one of 5GMM.REGISTERED.UPDATE-NEEDED and 5GMM-REGISTERED.ATTEMPTING-REGISTRATION-UPDATE substates provided the cell the UE is camped on is part of the non-allowed area or is of the registered PLMN or the equivalent PLMN which is not part of the allowed area, such that all restrictions that are applicable in the 5GMM-REGISTERED.NON-ALLOWED-SERVICE substate are also applicable in the selected substate in addition to any restrictions already be associated with the selected substate.

5. A baseband processor for a user equipment (UE) that is configured to cause the UE to:

determine criteria comprising (i) whether a current tracking area is included in a registration area, (ii) whether an update status at the UE is 5U1, and (iii) whether the cell is part of a non-allowed area or is of a registered public land mobile network (PLMN) or an equivalent PLMN that is not part of an allowed area; and in response to determining that (i) the current tracking area is in the registration area, (ii) the update status at the UE is 5U1, and (iii) the cell is part of the non-allowed area or is of a registered PLMN or an equivalent PLMN that is not part of an allowed area, choose a 5GMM-REGISTERED.NON-ALLOWED-SERVICE substate.

6. The baseband processor of claim 5, in which restrictions applicable to the UE in the 5GMM-REGISTERED.NON-ALLOWED-SERVICE substate are also applicable in a selected substate comprising at least one of 5GMM.REGISTERED.UPDATE-NEEDED and 5GMM-REGISTERED.ATTEMPTING-REGISTRATION-UPDATE substates provided the cell the UE is camped on is part of the non-allowed area or is of the registered PLMN or the equivalent PLMN which is not part of the allowed area, such that all restrictions that are applicable in the 5GMM-REGISTERED.NON-ALLOWED-SERVICE substate are also applicable in the selected substate in addition to any restrictions already be associated with the selected substate.

* * * * *